May 27, 1952     E. E. GESNER     2,598,251
TOOL-SUPPORTING CARRIAGE
Filed Oct. 31, 1946     2 SHEETS—SHEET 1
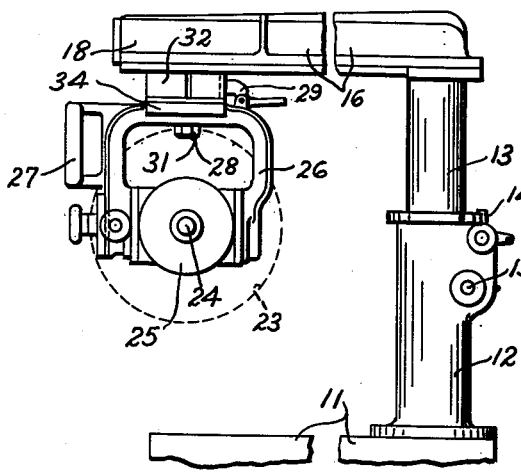
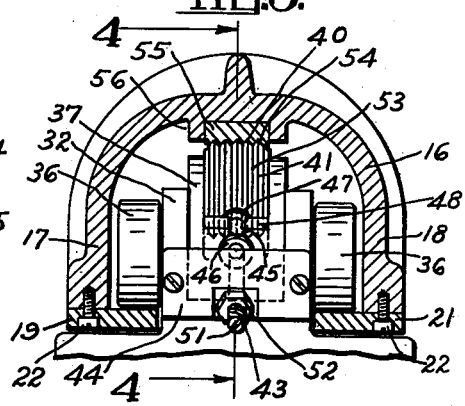
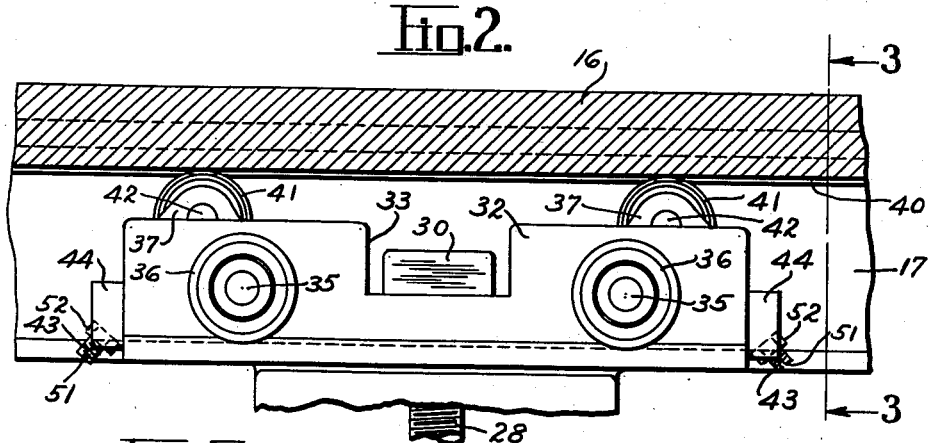
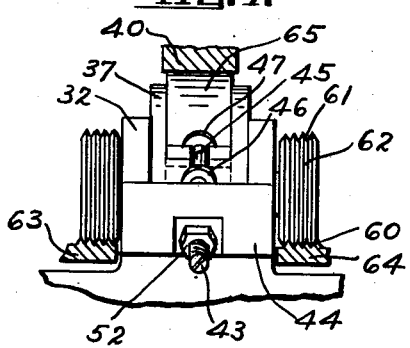
Inventor
Edwin E. Gesner.
By Walter S. Edwards
Attorney

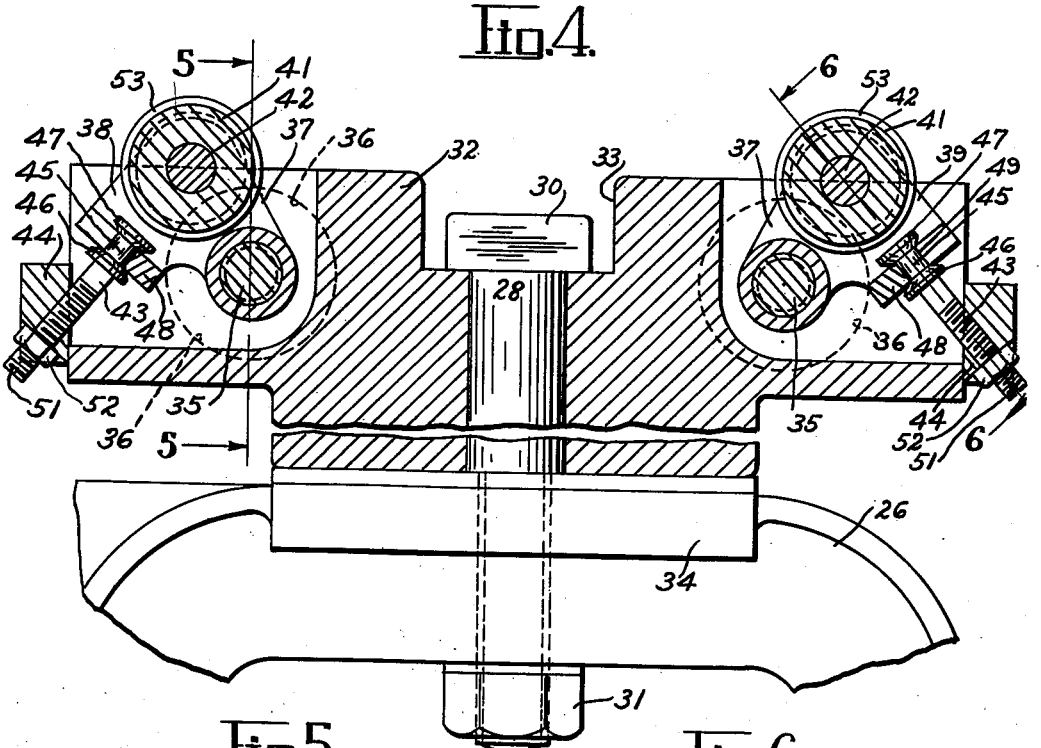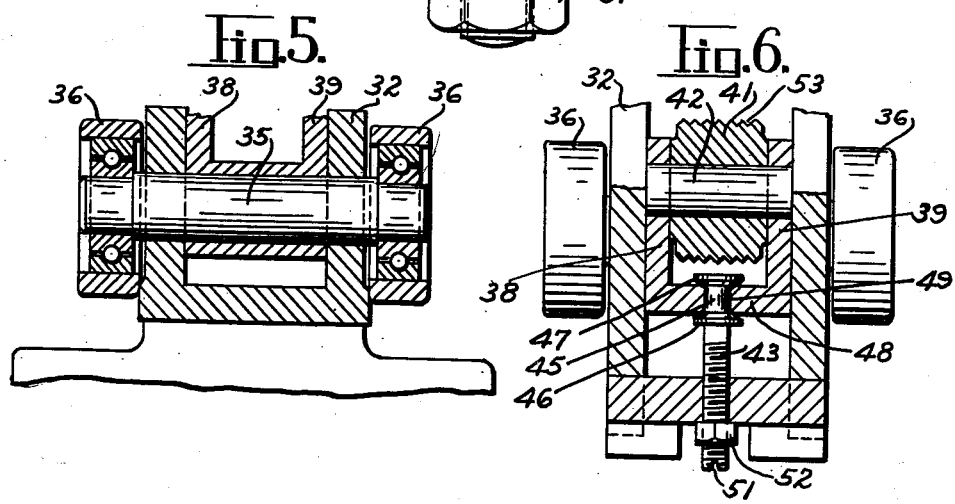

Patented May 27, 1952

2,598,251

UNITED STATES PATENT OFFICE 2,598,251

TOOL SUPPORTING CARRIAGE

Edwin E. Gesner, New Haven, Conn.

Application October 31, 1946, Serial No. 706,856

17 Claims. (Cl. 308—6)

This invention relates to tool carriages and more particularly to a tool carriage adapted to reciprocate in a supporting structure to carry a supported tool transversely across work to be acted upon by the tool. The tool carriage of this invention is particularly adapted to support a circular saw of a wood working machine of the type generally known as radial saws.

The features and principles of this invention are herein illustrated embodied in a carriage adapted to support a motor driven circular saw and to be reciprocated in an arm which overhangs the work to be cut by the saw. It is particularly desired in structures of this nature that the travel of the saw, or tool, across the work, be in a straight line, parallel with the surface of the work supporting table upon which the work is supported, and that all subsequent cuts be parallel with each other. It is also desirable that the carriage be freely movable along the supporting arm, that it be accurately guided in the arm without appreciable lateral or vertical play, and that the effects of wear may be quickly and readily compensated for by the provision of easily operated and accessible means.

One object of this invention is to provide an improved tool supporting carriage.

Another object is to provide in a tool carriage of the above nature, improved means to guide it in its reciprocatory movements in its supporting member.

Still another object is to provide improved means, in the structure of a tool carriage, to compensate for wear of the movable and cooperating parts thereof.

A further object is to provide in a radial saw an improved circular saw supporting and guiding mechanism whereby the travel of the saw across, or along, the work to be acted upon thereby, will be in a straight line without appreciable variation and be parallel to the surface of the work supporting table.

A still further object is to provide an improved tool supporting carriage which will be relatively inexpensive to manufacture, simple in construction, of a minimum number of parts, compact, pleasing in appearance, and very efficient and durable in use.

With the above and other objects in view, which will appear as the description proceeds, there has been illustrated in the accompanying drawings, one form of reciprocatory carriage in which the features and principles of this invention may be conveniently and practically embodied.

In the drawings:

Figure 1 is a side view of a radial saw having an arm extending over a work supporting table and which is adapted to support, for reciprocatory movement, the improved tool carriage of this invention;

Figure 2 is a side view of a tool carriage embodying the features and principles of this invention and shown in operative position in the arm of the radial saw of Figure 1, the arm being in longitudinal section to permit clear representation of the carriage;

Figure 3 is an end view of the tool carriage shown in Figure 2, the supporting arm being sectioned on the line 3—3 of Figure 2;

Figure 4 is an enlarged longitudinal sectional view of the tool carriage taken on the line 4—4 of Figure 3;

Figure 5 is a cross-sectional view taken on the line 5—5 of Figure 4;

Figure 6 is a cross-sectional view taken on the line 6—6 of Figure 4; and

Figure 7 is a somewhat modified form of a structural feature of this invention.

Referring now to the drawings wherein like reference numerals designate like parts throughout the several views, the reference numeral 11 (Figure 1) denotes a work supporting table of a radial saw and having a pedestal 12 extending vertically upward from one side thereof. A cylindrical spindle 13 is rotatively mounted in the pedestal 12 and is adapted to be raised and lowered in respect thereto. Means consisting of a catch 14 and a clamp 15 are provided to lock the spindle 13 in any of its adjusted positions in respect to pedestal 12. An arm 16 extends horizontally from the upper end of the spindle 13 to overhang the work supporting table 11. The arm 16 is securely fastened to, or is integral with the spindle 13 to be raised, or lowered, and to swing therewith, and thus is locked in its adjusted positions by either the catch 14, or the clamp 15.

The arm 16 is generally inverted U-shaped in cross-section with depending legs 17 and 18. Carriage supporting bars, or tracks, 19 and 21 (see Figure 3) are secured to and along the lower edge of the legs 17 and 18 respectively by screws 22. The tracks 19 and 21 extend inwardly toward each other, and extend substantially the entire length of the arm 16 to provide the maximum of reciprocatory movement for the tool, in this instance a circular saw 23, supported on the carriage of this invention, across any work supported on the table 11. The circular saw 23 is mounted on the end of the shaft 24 of an electric motor 25, supported on a frame 26. A hand grip 27 is provided on the frame 26 by which the saw 23 may be moved with its motor and the carriage across the work table 11. The frame 26 is secured to the carriage, for rotative movement in a horizontal plane, by a journal bolt 28, and a catch 29 is provided to hold the frame 26 in its adjusted position.

The tool supporting carriage in which the features and principles of this invention are embodied (see Figures 4, 5, and 6) includes an elongated rectangular base block 32 which is cutaway as at 33 in its upper surface intermediate its ends to receive the head 30 of the journal bolt 28. The bolt 28 extends downwardly through the base block 32 and a base lug 34 of the frame 26. The lower end of the bolt is threaded to receive a nut 31 whereby the frame 26 is secured to the carriage. A shaft 35 extends laterally through, and beyond each side of, the base block 32 adjacent each end thereof. A roller 36 is journaled on each of the outwardly extending ends of each shaft 35, the rollers 36 at one side of the base block 32 being adapted to ride on the inwardly disposed portion of the track 19, and the rollers 36 at the other side of the base block 32 being adapted to ride on the inwardly disposed portion of the track 21 within the U-shape of the arm 16. The base block 32 is cutaway at each end toward its middle to form a recess to receive a bracket 37. The brackets 37 are journaled on the roller shafts 35 for swinging movement in a vertical plane.

The brackets 37 are generally U-shaped in cross-section and have spaced apart arms 38 and 39 which straddle a roller 41. The roller 41 is journaled on a shaft 42 which extends through and between the bracket arms 38 and 39. The brackets 37 are adapted to be swung on the roller shafts 35 to raise, or lower, the rollers 41, to vary their engagement with a track 40 provided along the internal upper surface of the arm 16. A threaded rod 43, which is screw-threaded through a cross bar 44, secured at each end of the base block 32, has a head 45 at its inner end provided with flanges 46 and 47 spaced apart lengthwise of the rod. The flanges 46 and 47 are disposed one on each side of a cross bar 48 secured to and extending between the outer ends of the bracket arms 38 and 39, the rod head 45, between the flanges 46 and 47 being disposed in a slot 49 provided in the cross-bar 48. By rotation of the rod 43 the bracket 37 may be swung on the shaft 35 to raise or lower it. A slot 51 is provided in the outer end of the rod 43 by which it may be rotated by a screw driver. The slotted end of each rod 43 is readily accessible from in under the arm 16. A lock nut 52 is provided on the outer end of the rod 43 to tightly lock the latter in bracket adjustable position by binding against the bar 48.

The rollers 41 are disposed intermediate the adjacent pair of rollers 36 at each end of the base block 32 and are spaced upwardly therefrom to form a three-point suspension for the base block at each end, the rollers 36 riding on the tracks 19 and 21 and the roller 41 riding on the track 40. By adjusting the rollers 41 by means of the threaded rod 43 a rigid support of the carriage base block 32 in the arm 16 against possible vertical movement may be maintained. To obviate possible lateral movement of the tool carriage base block 32 in the arm 16 cooperating means is provided between the one set of rollers and the track it engages. Preferably the cooperating means to prevent lateral movement is provided between the rollers 41 and the track 40 and comprises parallel generally inverted V-shaped annular ribs 53 formed on the periphery of the rollers 41 spaced apart by V-shaped grooves and V-shaped ribs 54 formed along substantially the entire length of the track 40 and spaced apart by inverted V-shaped grooves. The ribs 53 and 54 cooperate by intermeshing to prevent appreciable lateral play of the carriage base block 32 during its reciprocating movement along the arm 16. The ribbed track 40 may be formed in a strip of material 55 secured to the inner surface 56 of the arm 16, or directly in the material of the arm at this point.

Figure 7 illustrates the provision of cooperating intermeshing ribs 61 formed on the periphery of rollers 62, corresponding to the previously described rollers 36, and ribs 60 formed along the tracks 63 and 64, corresponding to the tracks 19 and 21 of the previously described form. The rollers 65, corresponding to rollers 41 are not ribbed in this instance. In the first described form the rollers 36 are the load carrying ones and the rollers 41 are the carriage guiding rollers. In the form shown in Figure 7 the rollers 62 are both load supporting and guiding ones. In both instances adjustment of rollers 61 or 65 varies the contact of all rollers with their respective tracks.

By machining and installing the tracks 19, 21 and 40 parallel with the upper surface of a work support and cutting the ribs 54 and 60 in parallel and parallel with the direction of the required movement of the saw, the carriage will be reciprocated across the work as is desired and the saw, or tool, will operate on the work in the accurate manner required. While it is preferable that a plurality of intermeshing ribs be provided in the rollers and tracks, the number may vary from one to any number found to be most efficient in accordance with the operating conditions of the machine, and the work to be accomplished. The intermeshing ribs form the means by which the carriage is guided in its reciprocating movement along the arm, or carriage support, 16.

The provision in a machine of the type requiring the movement of a tool parallel to a work holding mechanism, of a carriage and carriage guide as above described insures accurate and efficient operation of the tool upon the work. Due to the features and principles of this invention, as above described in connection with the structure of a radial saw, a tool supporting carriage is provided which is relatively inexpensive to manufacture, of a minimum number of parts readily accessible for replacement and adjustment, and which will be very efficient and durable in use.

While there has been shown and described herein a mechanism in which the features and principles of this invention may be embodied in practice, it will be understood that the same may be embodied in other specific forms without departing from the spirit and essential attributes thereof, and it is therefore desired that the present embodiment be considered in all respects as illustrative, and not restrictive, reference being had to the claims rather than to the foregoing description to indicate the scope of the invention.

Having thus fully disclosed the invention, what is claimed as new and for which it is desired to secure Letters Patent is:

1. In a machine having a tool adapted to operate upon work supported upon a work support, a hollow stationary arm overhanging the work support, a tool supporting carriage movable lengthwise in the arm and having supporting rollers journaled at each side thereof and a roller journaled thereto intermediate the side rollers, a flat horizontal track at each side of said arm to support the side rollers, a track in said arm intermediate of and spaced upwardly from the side tracks to be engaged by said intermediate roller, and cooperating means between the intermediate roller and the intermediate track engaged thereby to guide the carriage along said arm.

2. In a machine having a tool adapted to operate upon work supported upon a work support, a hollow stationary arm overhanging the work support, a tool supporting carriage movable lengthwise in the arm and having supporting rollers journaled at each side thereof and a roller journaled thereto intermediate the side rollers, a flat horizontal track at each side of said arm to support the side rollers, a track in said arm intermediate of and spaced upwardly from the side tracks to be engaged by said intermediate roller, and cooperating means between one of said tracks and the roller engaged thereby to guide the carriage along said arm.

3. In a machine having a tool adapted to operate upon work supported upon a work support, a hollow stationary arm overhanging the work support, a tool supporting carriage movable lengthwise in the arm and having a pair of laterally spaced apart supporting rollers journaled at each end thereof, a roller spaced upwardly from and journaled to the carriage intermediate the supporting rollers of each pair, a flat horizontal track on said arm at each side of the carriage for the supporting rollers, a track intermediate of and spaced upwardly from the side tracks to be engaged by the intermediate rollers, and cooperating ribs and grooves in one of the tracks and the rollers engaged thereby to guide the carriage along said arm.

4. In a machine having a tool adapted to operate upon work supported upon a work support, a hollow stationary arm overhanging the work support, a tool supporting carriage movable lengthwise in the arm and having supporting rollers journaled at each side thereof and a roller journaled thereto intermediate the side rollers, a flat horizontal track at each side of said arm to support the side rollers, a track in said arm intermediate of and spaced upwardly from the side tracks to be engaged by said intermediate roller, cooperating means between the intermediate roller and the intermediate track engaged thereby to guide the carriage along said arm, and means to move the intermediate roller upwardly to adjust the contact of the side rollers on their respective tracks.

5. In a machine having a tool adapted to operate upon work supported upon a work support, a hollow stationary arm overhanging the work support, a tool supporting carriage movable lengthwise in the arm and having a pair of laterally spaced apart supporting rollers journaled at each end thereof, a roller spaced upwardly from and journaled to the carriage intermediate the supporting rollers of each pair, a flat horizontal track on said arm at each side of the carriage for the supporting rollers, a track intermediate of and spaced upwardly from the side tracks to be engaged by the intermediate rollers, a groove in one of the tracks and a rib on the roller engaging the same to guide the carriage along said arm, and means to move the intermediate roller upwardly to adjust the contact of the side rollers on their respective tracks.

6. In combination, an elongated hollow supporting member having parallel and laterally spaced apart side tracks along each side of said member and a track spaced upwardly from and intermediate of said side tracks, a tool supporting carriage adapted to be moved lengthwise in said member and having side rollers to ride on said side tracks, a shaft extending through said carriage and upon which said rollers are journaled, a bracket pivoted on said shaft intermediate said rollers, and a single roller adapted to engage said intermediate track carried by said bracket.

7. In combination, an elongated hollow supporting member having parallel and laterally spaced apart side tracks along each side of said member and a track spaced upwardly from and intermediate of said side tracks, a tool supporting carriage adapted to be moved lengthwise in said member and having side rollers to ride on said side tracks, a shaft extending through said carriage and upon which said rollers are journaled, a bracket pivoted on said shaft intermediate said rollers, a single roller adapted to engage said intermediate track carried by said bracket, and cooperating means between said single roller and the intermediate track to guide the carriage lengthwise in said member.

8. In combination, an elongated hollow supporting member having parallel and laterally spaced apart side tracks along each side of said member and a track spaced upwardly from and intermediate of said side tracks, a tool supporting carriage adapted to be moved lengthwise in said member and having side rollers to ride on said side tracks, a shaft extending through said carriage and upon which said rollers are journaled, a bracket pivoted on said shaft intermediate said rollers, a single roller adapted to engage said intermediate track carried by said bracket, ribs about the periphery of the single roller, and ribs extending lengthwise of the intermediate track, said ribs intermeshing to guide the carriage lengthwise in said member.

9. In combination, an elongated hollow supporting member having parallel and laterally spaced apart side tracks along each side of said member and a track spaced upwardly from and intermediate of said side track, a tool supporting carriage adapted to be moved lengthwise in said member and having side rollers to ride on said side tracks, a shaft extending through said carriage and upon which said rollers are journaled, a bracket pivoted on said shaft intermediate said rollers, and a single roller adapted to engage said intermediate track carried by said bracket, one of said tracks having ribs formed in its roller engaging surface, and ribs formed in the periphery of the roller engaging said ribbed track, the ribs in the track and on the roller intermeshing to guide the carriage in its lengthwise movement in said member.

10. In combination, an elongated hollow supporting member having parallel and laterally spaced apart side tracks along each side of said member and a track spaced upwardly from and intermediate of said side tracks, a tool supporting carriage adapted to be moved lengthwise in said member and having side rollers to ride on said side tracks, a shaft extending through said carriage and upon which said rollers are journaled, a bracket pivoted on said shaft intermediate said rollers, a single roller adapted to engage said intermediate track carried by said bracket, ribs about the periphery of the single roller, and ribs extending lengthwise of the intermediate track, said ribs intermeshing to guide the carriage lengthwise in said member, and means to swingingly adjust said bracket to vary the contact of said rollers on the respective tracks engaged thereby.

11. Guiding means for a tool supporting carriage adapted to be reciprocated in a stationary carriage supporting arm comprising, lengthwise extending horizontal tracks in said arm and rollers on said carriage, one of the rollers having a rib and the track engaged thereby having a groove, said rib intermeshing in the groove in said track at the contacting surfaces of said roller and track, and readily accessible means to adjust the contact pressure of said rollers upon said tracks.

12. Guiding means for a tool supporting carriage adapted to be reciprocated in a carriage supporting arm comprising, lengthwise extending tracks in said arm, a roller on each side and adjacent the lower surface of said carriage, a straight horizontal shaft upon which said rollers are journaled, and a roller mounted adjacent the upper surface of said carriage, each of said rollers engaging one of said tracks, one of the rollers having a rib and the track engaged thereby having a groove, said rib intermeshing in the groove in said track contacting surfaces of said roller and track.

13. Guiding means for a tool supporting carriage adapted to be reciprocated in a carriage supporting arm comprising, lengthwise extending tracks in said arm, a roller on each side and adjacent the lower surface of said carriage, a shaft upon which said rollers are journaled, and a roller adjacent the upper surface of said carriage and pivoted to swing on the said shaft, each of said rollers engaging one of said tracks, one of the rollers and the track engaged thereby having intermeshing ribs in their contacting surfaces, and means to swing said upper roller to adjust the contact pressure of all of the rollers on their respective tracks.

14. In a machine having a tool adapted to operate upon work supported upon a work support, a hollow arm overhanging the work support, a tool supporting carriage in the arm having a horizontal shaft and a pair of laterally spaced apart supporting rollers on said shaft, at each end thereof, a roller spaced upwardly from and journaled to the carriage intermediate the supporting rollers of each pair, a track on said arm at each side of the carriage for the supporting rollers, a track intermediate of and spaced upwardly from the side tracks to be engaged by the intermediate rollers and having a lengthwise groove therein, a rib on the intermediate rollers cooperating with the groove in said track to guide the carriage along said arm, and means to move each of the intermediate rollers upwardly to adjust the contact of the side rollers on their respective tracks.

15. In a machine having a tool adapted to operate upon work supported upon a work support, a hollow stationary arm overhanging the work support, a tool supporting carriage movable lengthwise in the arm and having a pair of laterally spaced apart supporting rollers at each end thereof, a roller spaced upwardly from and intermediate the supporting rollers of each pair, a flat horizontal track on said arm at each side of the carriage for the supporting rollers, a track intermediate of and spaced upwardly from the side tracks to be engaged by the intermediate rollers, and a cooperating rib and groove in one of the tracks and the rollers engaging the said track to guide the carriage along said arm.

16. In a machine having a tool adapted to operate upon work supported upon a work support, a hollow stationary arm overhanging the work support, a tool supporting carriage movable lengthwise in the arm and having supporting rollers at each side thereof and a roller intermediate the side rollers, a flat horizontal track at each side of said arm to support the side rollers, a track in said arm intermediate of and spaced upwardly from the side tracks to be engaged by said intermediate roller, cooperating means between the intermediate roller and the intermediate track engaged thereby to guide the carriage along said arm, and means to move the intermediate roller upwardly to adjust the contact of the side rollers on their respective tracks.

17. Guiding means for a tool supporting carriage adapted to be reciprocated in a stationary carriage supporting arm comprising, lengthwise extending horizontal tracks in said arm and rollers on said carriage, one of the rollers having an annular groove in its periphery, and the track engaged by said roller, having a corresponding and cooperating rib extending lengthwise thereof, and means to vertically adjust said grooved roller toward said track.

EDWIN E. GESNER.

REFERENCES CITED

The following references are of record in the file of this patent:

UNITED STATES PATENTS

| Number | Name | Date |
|---|---|---|
| 730,773 | Kincaid | June 9, 1903 |
| 1,222,876 | Lewson | Apr. 17, 1917 |
| 1,794,836 | De Wilt | Mar. 3, 1931 |
| 2,083,682 | Balsiger et al. | June 15, 1937 |
| 2,353,088 | Schutz | July 4, 1944 |
| 2,383,195 | Horman | Aug. 21, 1945 |